US008004962B2

(12) United States Patent
Yang et al.

(10) Patent No.: US 8,004,962 B2
(45) Date of Patent: Aug. 23, 2011

(54) METHOD AND SYSTEM OF ADDRESSING A PROBLEM ASSOCIATED WITH A NETWORK INCLUDING A VIDEO ACCESS READY DEVICE

(75) Inventors: Chen-Yui Yang, Marlboro, NJ (US); Paritosh Bajpay, Edison, NJ (US); Raghvendra Savoor, Walnut Creek, CA (US); Monowar Hossain, Middletown, NJ (US); Xidong Wu, Livermore, CA (US); Thiru Ilango, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 732 days.

(21) Appl. No.: 11/963,922

(22) Filed: Dec. 24, 2007

(65) Prior Publication Data
US 2009/0161530 A1    Jun. 25, 2009

(51) Int. Cl.
G01R 31/08 (2006.01)
G06F 11/00 (2006.01)
G06F 11/16 (2006.01)
G08C 15/00 (2006.01)
H04J 1/16 (2006.01)
H04J 3/14 (2006.01)
H04L 1/00 (2006.01)
H04L 12/26 (2006.01)
H04L 12/28 (2006.01)
H04N 7/173 (2011.01)

(52) U.S. Cl. ........ 370/216; 370/218; 370/242; 370/244; 714/3; 714/4.1; 714/4.21; 714/4.3; 714/4.4; 725/107

(58) Field of Classification Search .......... 370/216–218, 370/221; 725/107
See application file for complete search history.

(56) References Cited

U.S. PATENT DOCUMENTS

| 6,195,415 B1 * | 2/2001 | Shimoda et al. ................. 379/22 |
| 6,205,143 B1 | 3/2001 | Lemieux |
| 6,414,960 B1 | 7/2002 | Kuhn et al. |
| 6,678,012 B1 * | 1/2004 | Belotserkovsky ............ 348/731 |
| 6,724,831 B1 * | 4/2004 | Hasegawa et al. ............ 375/297 |
| 7,085,238 B2 | 8/2006 | McBeath |
| 7,181,360 B1 | 2/2007 | Nikolac et al. |

(Continued)

OTHER PUBLICATIONS

Spirent SmartSight: Automated Testing and Diagnostics for Triple Play Service Assurance, Sprirent Communications, Inc., 2003.

*Primary Examiner* — Ayaz R Sheikh
*Assistant Examiner* — Tarell Hampton
(74) *Attorney, Agent, or Firm* — Pablo Meles; Meles Guntin & Gust, PLC

(57) ABSTRACT

A method can be used to detect a problem, isolate the cause of the problem to a particular device in which the cause resides, and potentially repairing the particular device. In one embodiment, the method can be fully automated using a system. In another embodiment, the method may be partly automated. In this particular embodiment, the system can perform most or all of the testing or diagnosis automatically. The system can perform the method until a point where human intervention is required. The problem, the cause, and particular device may be known at the time notification is sent to customer care, a workcenter, or another network operations center. With the information regarding the problem, cause and particular device, a technician or other personnel can be dispatched and repair the problem more quickly than if only the problem is provided and the technician needs to perform the testing and diagnosis.

19 Claims, 7 Drawing Sheets

U.S. PATENT DOCUMENTS

| | | |
|---|---|---|
| 7,212,496 B1 | 5/2007 | Chong |
| 7,245,701 B2 | 7/2007 | Tennyson et al. |
| 7,594,252 B2 * | 9/2009 | Johnson et al. ............... 725/107 |
| 7,706,252 B2 * | 4/2010 | Catter et al. .................. 370/216 |
| 2003/0093563 A1 | 5/2003 | Young et al. |
| 2003/0149991 A1 * | 8/2003 | Reidhead et al. ............. 725/119 |
| 2003/0182666 A1 | 9/2003 | You |
| 2004/0153857 A1 * | 8/2004 | Yamazaki et al. ............. 714/43 |
| 2005/0044404 A1 * | 2/2005 | Bhansali et al. ............... 713/200 |
| 2005/0163052 A1 | 7/2005 | Savage et al. |
| 2005/0183130 A1 * | 8/2005 | Sadja et al. ................... 725/107 |
| 2005/0204397 A1 * | 9/2005 | Miyazoe et al. ............... 725/107 |
| 2006/0067237 A1 | 3/2006 | Burns et al. |
| 2006/0269163 A1 | 11/2006 | Chen et al. |
| 2007/0121792 A1 | 5/2007 | Chong |

* cited by examiner

METHOD AND SYSTEM OF ADDRESSING A PROBLEM ASSOCIATED WITH A NETWORK INCLUDING A VIDEO ACCESS READY DEVICE

FIELD OF THE DISCLOSURE

The present disclosure generally relates to networks or methods of using the same, and more particularly relates to methods and systems of addressing problems associated with networks including video access ready devices.

BACKGROUND

Delivery of services provided to customers of a network is becoming more competitive as the number of service offerings increases. Many service providers provide telephone services, Internet access, video services, other appropriate services, or any combination thereof to customers. These services may be provided to the customer's premises via a packet-switched network.

Content corresponding to the services can include streaming broadcast video content, video on demand, telephonic data for telephone calls, files (including documents, digital pictures, etc.), or the like. The order in which packets are delivered and reassembled at the customer premises may or may not be a significant problem. For example if packets are dropped and resent for a file, the downloading of the file may be slower, but the contents of the file will be complete when the download is completed. If a packet is dropped during a telephone call, the person listening to the other party speaking may assume that the other party paused for a fraction of a second when talking.

Unlike other content, streaming broadcast video content, such as that provided by Internet Protocol Television, is significantly more sensitive to proper transmission of packets. The customer experiencing the streaming broadcast video content is more likely to notice the problems as compared to other content delivered over a packet-switched network.

Currently, a relatively manual process is used to deal with problems related to a video transport system used for a packetized video content. For example, the customer can call a customer care center. After interacting with the customer, the customer service representative can generate a ticket for the condition that the customer is experiencing. The customer service representative may need to classify the condition so that the ticket can be routed to one or more appropriate areas. For example, the ticket may be received by a network administrator to check the network connections that could affect the streaming broadcast video content being sent to the customer premises. Alternatively, or in addition, a technician may be dispatched to address a video ready access device that is located in the field, to the customer premises, or both.

BRIEF DESCRIPTION OF THE DRAWINGS

Skilled artisans will appreciate that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, understand that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
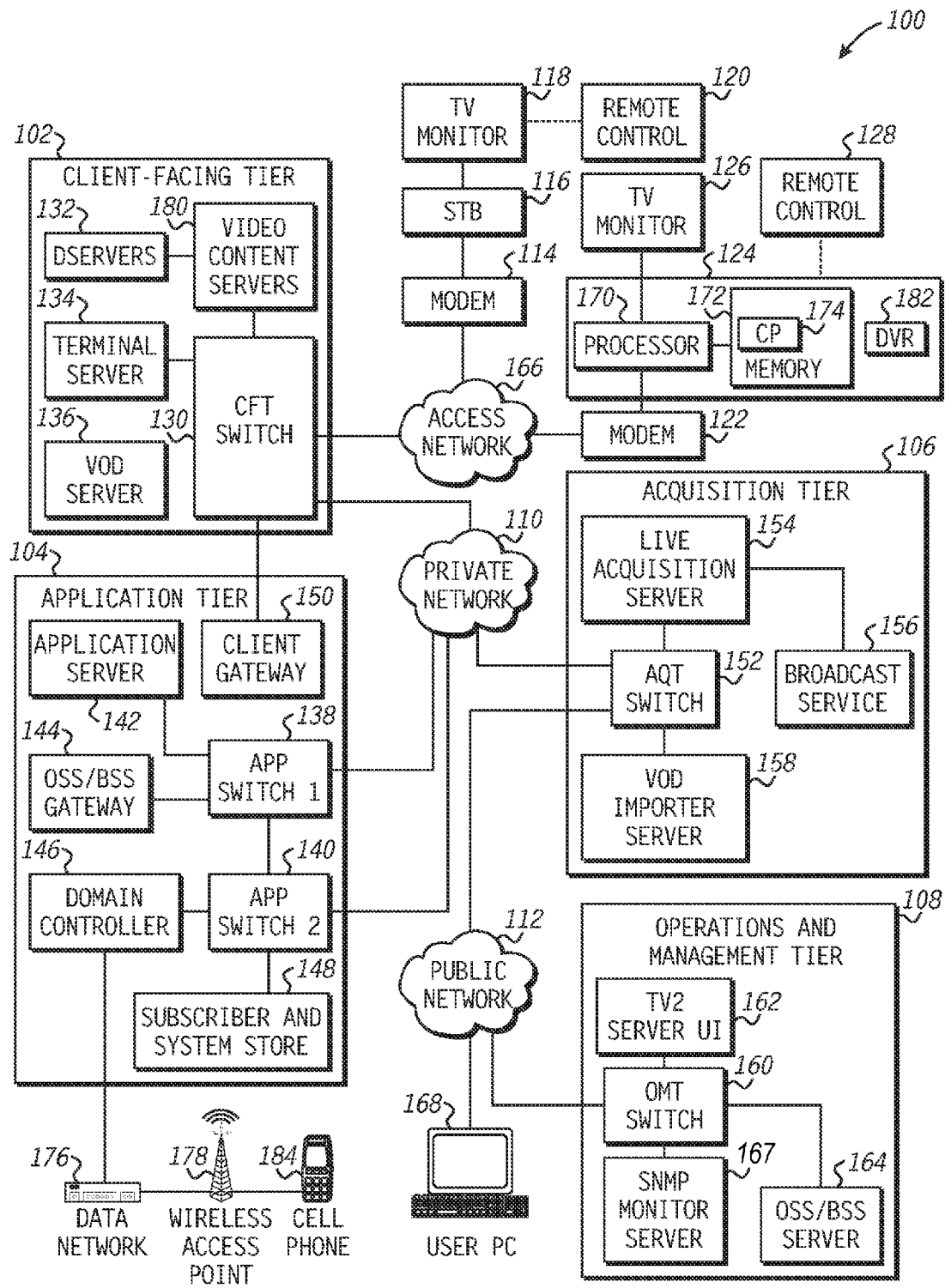
FIG. 1 includes a block diagram illustrating an embodiment of an Internet protocol television system.

FIG. 1 includes an illustration of an Internet protocol television (IPTV) system 100 including a client facing tier 102, an application tier 104, an acquisition tier 106, and an operations and management tier 108. Each tier 102, 104, 106, and 108 is coupled to one or both of a private network 110 and a public network 112. For example, the client-facing tier 102 can be coupled to the private network 110, while the application tier 104 can be coupled to the private network 110 and to a public network, such as the Internet. The acquisition tier 106 can also be coupled to the private network 110 and to the public network 112. Moreover, the operations and management tier 108 can be coupled to the public network 112.

The various tiers 102, 104, 106 and 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104 can communicate directly with the client-facing tier 102.

The client-facing tier 102 can communicate with user equipment via a private access network 166, such as an IPTV network. In an illustrative embodiment, modems, such as a first modem 114 and a second modem 122, can be coupled to the private access network 166. The client-facing tier 102 can communicate with a first representative set-top box (STB) device 116 via the first modem 114 and with a second representative STB device 124 via the second modem 122. The client-facing tier 102 can communicate with a large number of STBs over a wide geographic area, such as a regional area, a metropolitan area, a viewing area, or any other suitable geographic area that can be supported by networking the client-facing tier 102 to numerous STB devices. In one embodiment, the client-facing tier 102 can be coupled to the modems 114 and 122 via fiber optic cables. Alternatively, the modems 114 and 122 can be digital subscriber line (DSL) modems that are coupled to one or more network nodes via twisted pairs, and the client-facing tier 102 can be coupled to the network nodes via fiber-optic cables. Each STB device 116 and 124 can process data received from the private access network 166 via an IPTV software platform, such as Microsoft® TV IPTV Edition.

The first STB device 116 can be coupled to a first display device 118, such as a first television monitor, and the second STB device 124 can be coupled to a second display device 126, such as a second television monitor. Moreover, the first STB device 116 can communicate with a first remote control 120, and the second STB device can communicate with a second remote control 128. In an exemplary, non-limiting embodiment, each STB device 116 and 124 can receive data or video from the client-facing tier 102 via the private access network 166 and render or display the data or video at the display device 118 or 126 to which it is coupled. The STB devices 116 and 124 thus may include tuners that receive and decode television programming information for transmission to the display devices 118 and 126. Further, the STB devices 116 and 124 can include an STB processor 170 and an STB memory device 172 that is accessible to the STB processor. In a particular embodiment, the STB devices 116 and 124 can also communicate commands received from the remote controls 120 and 128 back to the client-facing tier 102 via the private access network 166.

In an illustrative embodiment, the client-facing tier 102 can include a client-facing tier (CFT) switch 130 that manages communication between the client-facing tier 102 and the private access network 166 and between the client-facing tier 102 and the private network 110. As shown, the CFT switch 130 is coupled to one or more data servers 132 that store data transmitted in response to user requests, such as video-on-demand (VOD) content. The CFT switch 130 can also be coupled to a terminal server 134 that provides terminal devices, such as a game application server and other devices with a common connection point to the private network 110. In a particular embodiment, the CFT switch 130 can also be coupled to a VOD server 136.

The application tier 104 can communicate with both the private network 110 and the public network 112. In this embodiment, the application tier 104 can include a first application tier (APP) switch 138 and a second APP switch 140. In a particular embodiment, the first APP switch 138 can be coupled to the second APP switch 140. The first APP switch 138 can be coupled to an application server 142 and to an OSS/BSS gateway 144. The application server 142 provides applications to the STB devices 116 and 124 via the private access network 166, so the STB devices 116 and 124 can provide functions, such as display, messaging, processing of IPTV data and VOD material. In a particular embodiment, the OSS/BSS gateway 144 includes operation systems and support (OSS) data, as well as billing systems and support (BSS) data.

The second APP switch 140 can be coupled to a domain controller 146 that provides web access, for example, to users via the public network 112. The second APP switch 140 can be coupled to a subscriber and system store 148 that includes account information, such as account information that is associated with users who access the system 100 via the private network 110 or the public network 112. In a particular embodiment, the application tier 104 can also include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto.

In a particular embodiment, the STB devices 116 and 124 can access the system via the private access network 166 using information received from the client gateway 150. The private access network 166 provides security for the private network 110. User devices can access the client gateway 150 via the private access network 166, and the client gateway 150 can allow such devices to access the private network 110 once the devices are authenticated or verified. Similarly, the client gateway 150 can prevent unauthorized devices, such as hacker computers or stolen STB devices, from accessing the private network 110, by denying access to these devices beyond the private access network 166.

For example, when the STB device 116 accesses the system 100 via the private access network 166, the client gateway 150 can verify subscriber information by communicating with the subscriber and system store 148 via the private network 110, the first APP switch 138 and the second APP switch 140. Further, the client gateway 150 can verify billing information and status by communicating with the OSS/BSS gateway 144 via the private network 110 and the first APP switch 138. The OSS/BSS gateway 144 can transmit a query across the first APP switch 138, to the second APP switch 140, and the second APP switch 140 can communicate the query across the public network 112 to the OSS/BSS server 164. After the client gateway 150 confirms subscriber and/or billing information, the client gateway 150 can allow the STB device 116 access to IPTV content and VOD content. If the client gateway 150 cannot verify subscriber information for the STB device 116, such as because it is connected to a different twisted pair, the client gateway 150 can deny transmissions to and from the STB device 116 beyond the private access network 166.

The acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives television content, for example, from a broadcast service 156. Further, the AQT switch 152 can be coupled to a VOD importer server 158 that stores television content received at the acquisition tier 106 and communicate the stored content to the client-facing tier 102 via the private network 110.

The operations and management tier 108 can include an operations and management tier (OMT) switch 160 that conducts communication between the operations and management tier 108 and the public network 112. In the illustrated embodiment, the OMT switch 160 is coupled to a TV2 server 162. Additionally, the OMT switch 160 can be coupled to an OSS/BSS server 164 and to a simple network management protocol (SNMP) monitor 167 that monitors network devices. In a particular embodiment, the OMT switch 160 can communicate with the AQT switch 152 via the public network 112.

In a particular embodiment, during operation of the IPTV system, the live acquisition server 154 can acquire television content from the broadcast service 156. The live acquisition server 154 in turn can transmit the television content to the AQT switch 152, and the AQT switch 152 can transmit the television content to the CFT switch 130 via the private network 110. Further, the television content can be encoded at the D-servers 132, and the CFT switch 130 can communicate the television content to the modems 114 and 122 via the private access network 166. The STB devices 116 and 124 can receive the television content from the modems 114 and 122, decode the television content, and transmit the content to the display devices 118 and 126 according to commands from the remote control devices 120 and 128.

Additionally, at the acquisition tier 106, the VOD importer server 158 can receive content from one or more VOD sources outside the IPTV system 100, such as movie studios and programmers of non-live content. The VOD importer server 158 can transmit the VOD content to the AQT switch 152, and the AQT switch 152 in turn can communicate the material to the CFT switch 130 via the private network 110. The VOD content can be stored at one or more servers, such as the VOD server 136.

When a user issues a request for VOD content to the STB device 116 or 124, the request can be transmitted over the private access network 166 to the VOD server 136 via the CFT switch 130. Upon receiving such a request, the VOD server 136 can retrieve requested VOD content and transmit the content to the STB device 116 or 124 across the private access network 166 via the CFT switch 130. In an illustrative embodiment, the live acquisition server 154 can transmit the television content to the AQT switch 152, and the AQT switch 152 in turn can transmit the television content to the OMT switch 160 via the public network 112. In this embodiment, the OMT switch 160 can transmit the television content to the TV2 server 162 for display to users accessing the user interface at the TV2 server. For example, a user can access the TV2 server 162 using a personal computer (PC) 168 coupled to the public network 112.

The domain controller 146 communicates with the public network 112 via the second APP switch 140. Additionally, the domain controller 146 can communicate via the public network 112 with the PC 168. For example, the domain controller 146 can display a web portal via the public network 112 and allow users to access the web portal using the PC 168. Further, in an illustrative embodiment, the domain controller 146 can communicate with at least one wireless network access point 178 over a data network 176. In this embodiment, each wireless network access device 178 can communicate with user wireless devices, such as a cellular telephone 180.

In a particular embodiment, the STB devices can include an STB computer program 174 that is embedded within the STB memory device 172. The STB computer program 174 can contain instructions to receive and execute at least one user television viewing preference that a user has entered by accessing an Internet user account via the domain controller 146. For example, the user can use the PC 168 to access a web portal maintained by the domain controller 146 via the Internet. The domain controller 146 can query the subscriber and system store 148 via the private network 110 for account information associated with the user. In a particular embodiment, the account information can associate the user's Internet account with the second STB device 124. For instance, in an illustrative embodiment, the account information can relate the user's account to the second STB device 124 by associating the user account with an IP address of the second STB device 124, with data relating to one or more twisted pairs connected with the second STB device 124, with data related to one or more fiber optic cables connected with the second STB device 124, with an alphanumeric identifier of the second STB device 124, with any other data that is suitable for associating second STB device 124 with a user account, or with any combination of these.

Figure 2:
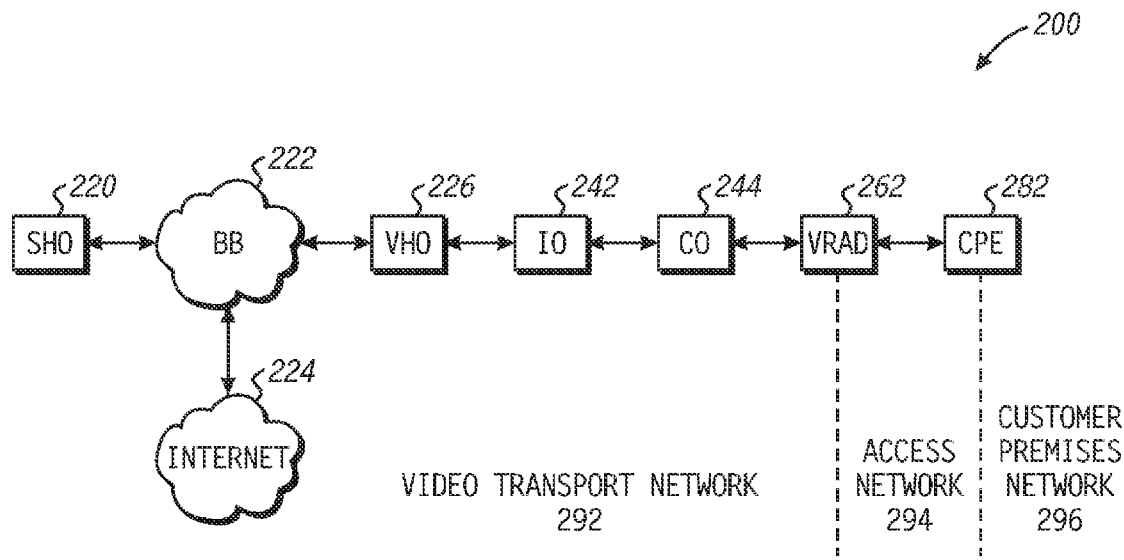
FIG. 2 includes a block diagram illustrating some of the connections between the customer premises and other portions of a network that supports the Internet protocol television system.

FIG. 2 includes an illustration of a portion of an exemplary network 200 that can be used to deliver digital content, such as IPTV using the IPTV system 100 in FIG. 1, to a customer. The network can include a super hub office (SHO) 220 that is bidirectionally coupled to an Internet protocol backbone (BB) 222 that is bidirectionally coupled to each of the Internet 224 and a video hub office (VHO) 226. In one embodiment, streaming video content provided from national broadcasting networks (e.g., ABC™, CBS™, CNN™, HBO™, etc.) can be sent to and received by the SHO 220. Streaming video content from local broadcasting networks can be sent to and received by the VHO 226. VOD content can be received by and stored within the VHO 226. Internet access can be established via the BB 222 to the Internet 224. Such Internet access can be useful for obtaining files, making calls, requesting other content, or any combination thereof by a customer at the customer premises.

Continuing with the network 200, an intermediate office (IO) 242 is by directionally coupled to the VHO 226 and a central office (CO) 244. The CO 244 is bidirectionally coupled to a video ready access device (VRAD) 262. The VRAM 262 can be similar to a digital subscriber line access multiplexer but is different because the VRAD 262 is particularly designed for streaming broadcast video, such as for IPTV. The VRAD 262 is bidirectionally coupled to customer premises equipment (CPE) 282.

Portions of the network 200 can be broken down into smaller networks for purposes of maintaining the network 200. For example, the portion of network 200 that is upstream of the VRAD 262 can be referred to as the video transport network, the portion of the network 200 from the VRAD 262 to the customer premises can be referred to as the access network, and the portion of the network 200 within the customer premises can be referred to as the customer premises network. The significance of the three different portions of the network 200 will become more apparent when describing a process of addressing a condition that is being experienced by a customer when using the customer premises equipment 282 in conjunction with the network 200.

After reading this specification, skilled artisans will appreciate that many different network configurations are possible. For example, VOD content may be accessed by a customer via the Internet 224 or the SHO 220, instead of the VHO 226. No intermediate office or a plurality of intermediate offices similar to the IO 242 may be used. More than one SHO or VHO may also be used. Thus, the particular implementation of a network used to provide services to a customer is variable and can be tailored to the needs or desires of a network operator. Therefore, the network 200 in FIG. 2 is merely for purposes of illustration and is not to be construed as limiting the scope of the present invention.

Figure 3:
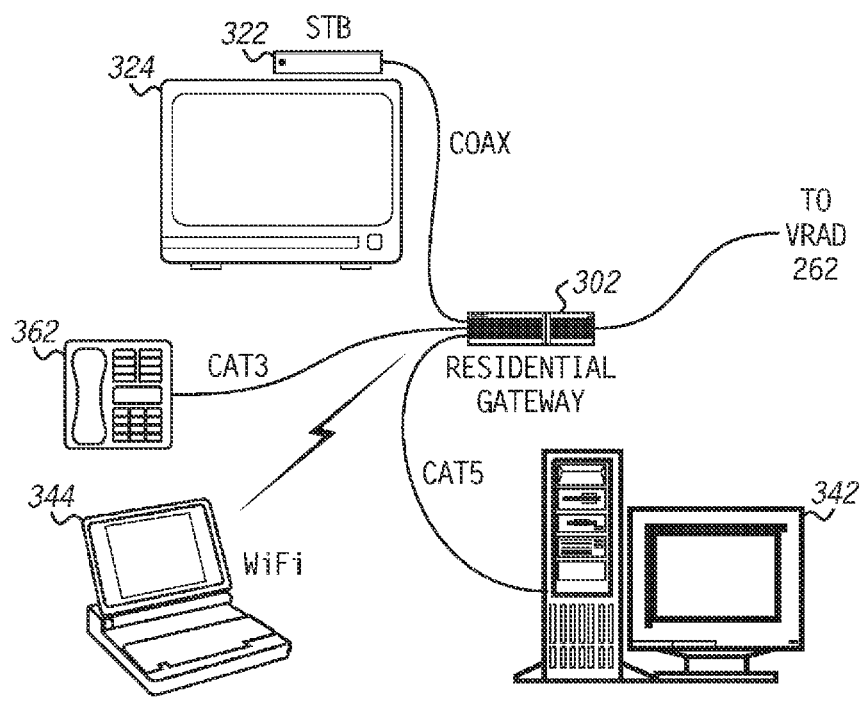
FIG. 3 includes an illustration of equipment that can be used at a customer premises.

FIG. 3 includes an illustration of exemplary customer premises equipment that can be used at the customer premises. Within the customer premises, a signal may be routed by a residential gateway (RG) 302 to a device within the customer premises. The RG 302 may include a variety of connections to allow different devices, different communication media, or any combination thereof to be used. For example, the RG 302 may be configured to work with a coaxial cable, a Category Five cable, a Category Three cable, a wireless transceiver, another suitable medium for transporting a signal, or any combination thereof. The RG 302 can be bidirectionally coupled to a STB 322 that can be coupled to a monitor 324, such as a television. The RG 302 can be by directionally coupled to a desktop computer 342 via a wireline connection, to a portable device 344 (e.g., a laptop computer, a personal digital assistant, a cellular phone, or another device that includes a processor), or any combination thereof. The RG 302 can be bidirectionally coupled to a telephone 362 via a wireline connection. In another embodiment, more or fewer devices, another type of device, or any combination thereof may be located at the customer premises and may be coupled to the RG 302.

Figure 4:
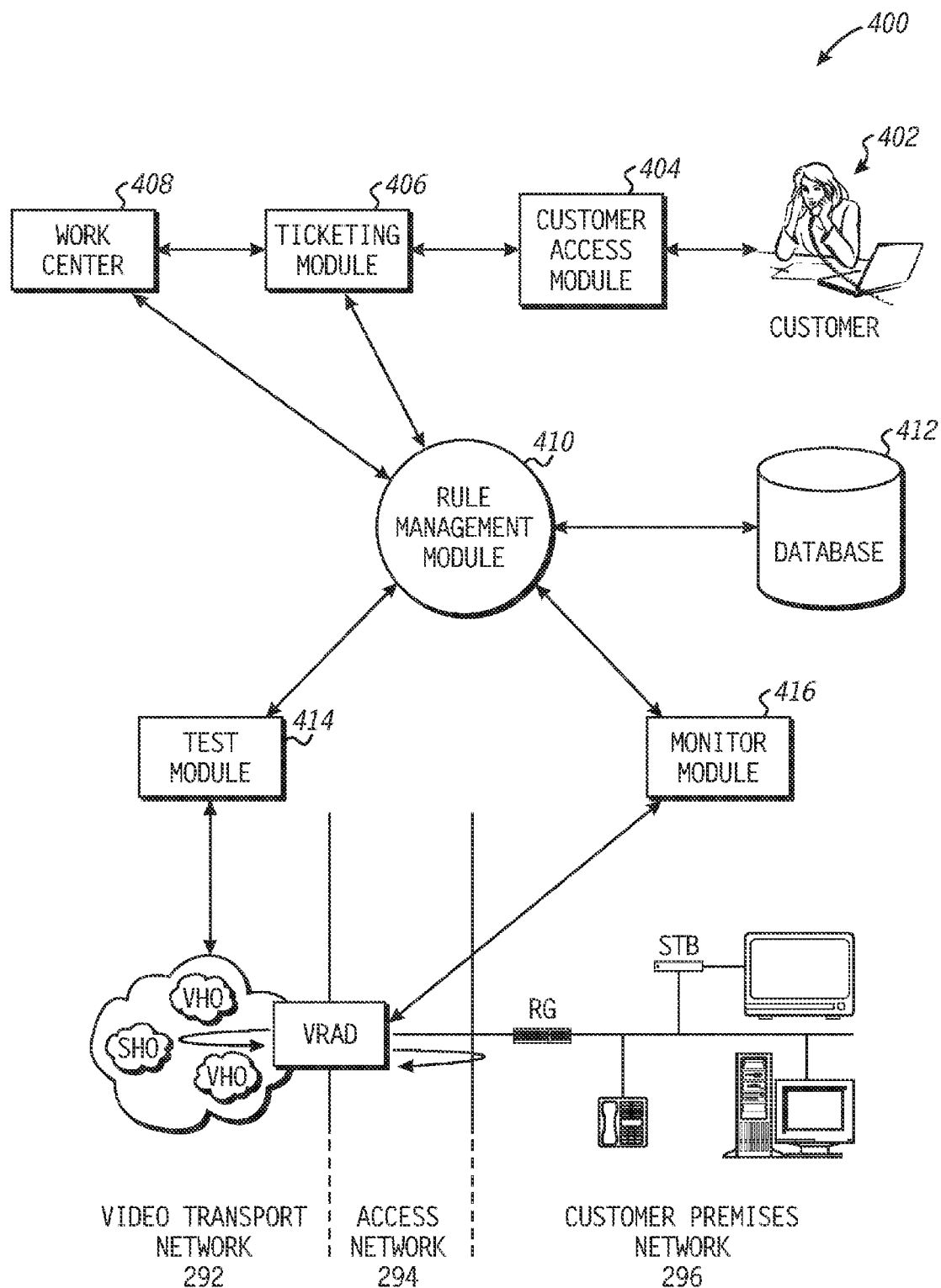
FIG. 4 includes an illustration of potential interactions between portions of a network in response to a customer request.

FIG. 4 includes a functional block diagram of an architecture for a system 400 that can be used to address problems within a network, and in a particular embodiment, for a network that transmits packetized video broadcast stream. The system 400 can use the network 200 as described with respect to FIGS. 2 and 3. The description of the system 400 and its functionality are described with respect to FIG. 4 and also with respect to exemplary methods of using the system 400 as described with respect to FIGS. 5 and 6.

A customer 402 can communicate with a customer access module 404 using any of the customer premises equipment as previously described with respect to FIG. 3. The customer access module 404 is designed to allow a customer to choose between using a fully automated method, a partially automated method, or interact with a customer service representative. The customer access module 404 is bidirectionally coupled to a ticketing module 406 that can be responsible for generating a ticket, tracking and updating progress of the ticket, and closing the ticket. The ticketing module 406 is bidirectionally coupled to a work center 408 and a rule management module 410. The work center 408 can include personnel to track progress of the ticket, assist in diagnosing the condition experienced by the customer, dispatch a technician, perform another suitable service, or the like.

The rule management module 410 is bidirectionally coupled to a database 412, a test module 414, and a monitor module 416. Some of the functions performed by the rule management module 410 can include receiving a notification regarding the problem within the network 200, isolating the cause of the problem to a particular device, determining whether hardware information associated with hardware of a particular device matches recorded information, determining whether a physical alarm, a video error message, or a combination thereof is valid, perform another suitable function in diagnosing the problem or generating instructions for other modules or devices within system to perform, or any combination thereof.

The test module 414 can include logic, hardware, other suitable equipment, or any combination thereof to test any portion of the video transport network 292, the access network 294, the customer premises network 296, or any combination thereof. In a particular embodiment, the test module can perform a line test between a particular device (e.g., the VRAD 262) and another device downstream of the particular device. In another embodiment, the test module 414 may be configured such that it can execute instructions from the rule management module 410 to perform particular tasks (e.g., resetting a piece of hardware, etc.).

The monitor module 416 can monitor the network 200 for problems, other events, or the like. As used herein, the term "problem" is to be construed broadly and can include an alarm (e.g., an error condition has been or is currently present) or an alert (e.g., an error condition has not yet occurred, but the error condition is about or predicted to occur). The monitor module 416 may also monitor the network 200 for maintenance, another suitable event, or any combination thereof. The maintenance entries can include preventive maintenance, scheduled or unscheduled maintenance, upgrades for hardware, software, firmware, or the like.

In one particular embodiment, the monitor module 416 can determine whether a software failure has occurred within the VRAD 262.

Although not illustrated, each of the modules may include hardware, software, firmware, or any combination thereof to perform the methods and functions as described herein. Thus, the rule management module 410 can include its own database that can be used to correlate conditions to service parameters, conditions to particular alarms, conditions to particular maintenance events, or the like. Further the rule management module 410 can include a server, a PC, or another computer in a different form (e.g., distributed computing system) to execute the logic used in performing the functions of the rule management module 410. Similarly, the ticketing module 406, the test module 414, and the monitor module 416 may likewise include their own or a shared database, and include a computing system that may be used by each module individually or shared between modules to execute the logic of functions to be performed by that particular module.

After reading this specification, skilled artisans will appreciate that other architectures can be used. For example, the database 412 can be a database that also includes test results and tests that can be performed by the test module 414, rules that are to be executed by the rule management module 410, information regarding alarms and maintenance events from the monitor module 416, tickets and ticket status information generated or used by the ticketing module 406, or the like. Functionality in one module may be combined with a different module. For example the functions of the test module 414 and the monitor module 416 could be combined in another embodiment. Functionality in one module could be divided into different modules. For example, a separate execution module (not illustrated) may be separated from the test module 414, and the separate execution module may perform actions, such as resetting hardware, producing stimuli to be monitored by the monitor module 416, or the like. Also, the monitor module 416 could have a module for alarms and alerts and another module for maintenance events. Further, functions of different modules may be partitioned in a different manner than illustrated or described. Other configurations can alternatively be used.

The utility of the architecture of the system 400 as illustrated in FIG. 4 will become more apparent with the process flows as described in FIGS. 5 to 8. The methods in FIGS. 5 to 8 can be used with an automated system and is described from the perspective of the automated system that receives communications, performs actions, and sends communications to the personnel within the network. As described below, information may be accessed by a device within the network. The term "accessing," with respect to information or other data, is to be broadly construed and includes retrieving, allowing receipt, or otherwise obtaining such information or such other information by a device within the network.

The method can include receiving a notification regarding a problem within the network 200. The problem may be reported by the customer 402 or may be detected by the monitor module 416 in FIG. 4. For the remainder of the methods described, the problem can be automatically detected within the network 200. The methodologies can be extended to customer-reported problems with no modification or only insubstantial differences.

Figure 5:
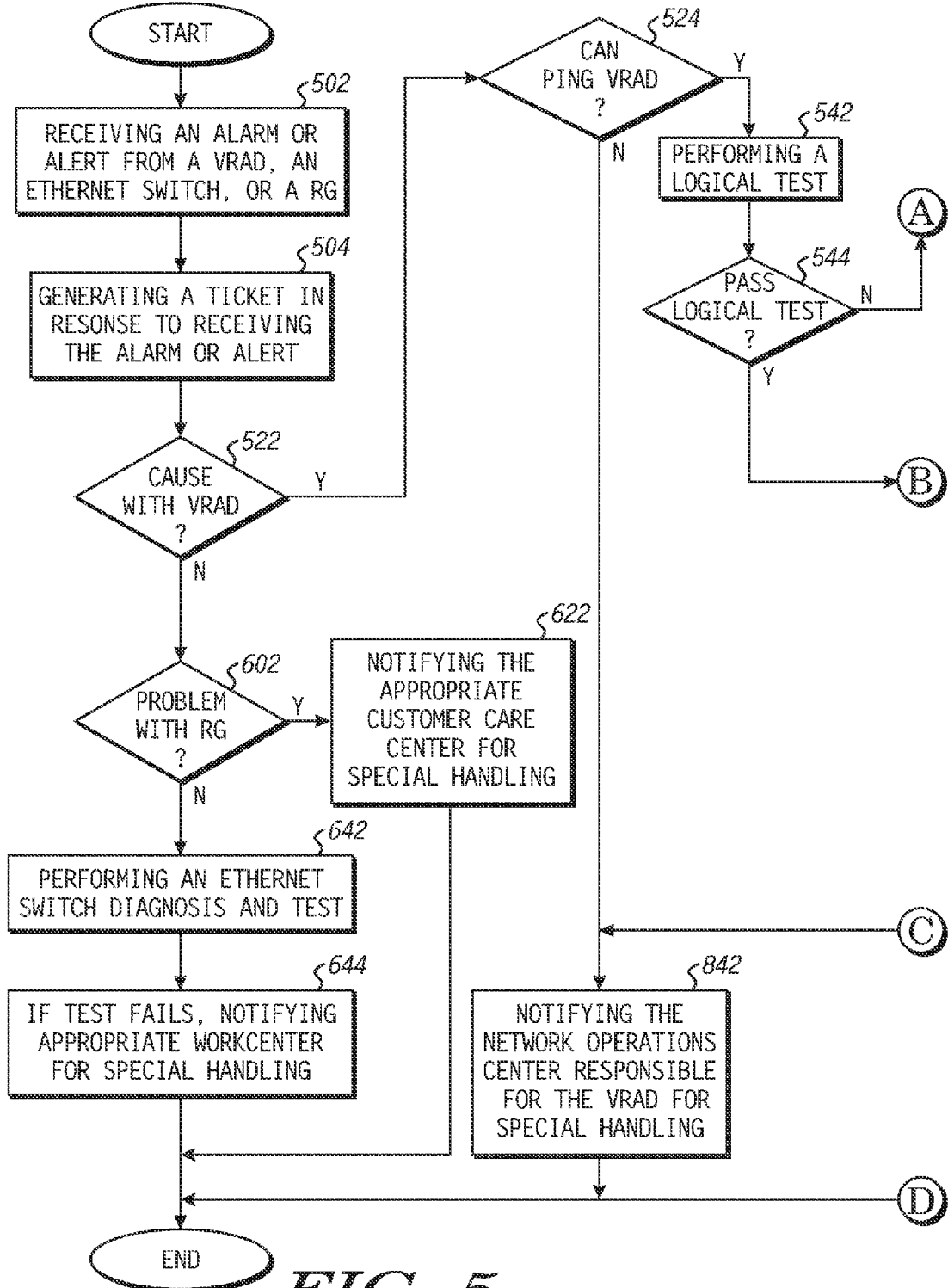
FIGS. 5 and 6 include a flow diagram illustrating actions that can be taken in response to a problem detected in a network including a video access ready device.

In one particular embodiment, the rule management module 410 receives the notification as an alarm or alert from a VRAD, an Ethernet switch, or a RG, at block 502 in FIG. 5. The method can further include generating a ticket in response to receiving the alarm or alert, at block 504. Information regarding the alarm or alert can be passed to the rule management module 410, which in turn, can send a communication to the ticketing module 406 to generate a ticket, so that the problem and progress in repairing the problem can be tracked.

The method can next include determining a particular device or portion of the network 200 in which the cause of the problem resides. For example, the particular device could be the VRAD 262 or the RG 302, or the portion of the network 200 can include devices and connections within the video transport network 292 or the customer premises network 296. One embodiment that can be used to determine the particular device or portion of the network in which the cause of the problem resides is presented as a non-limiting example later in this specification and illustrated in FIGS. 7 and 8.

In a particular embodiment, a determination can be made whether the cause of the problem resides within the VRAD, at decision tree 522 in FIG. 5. If the cause of the problem does not reside within the VRAD ("No" branch of decision tree 522), a determination can be made whether the cause of the problem resides within the RG, at decision tree 602 in FIG. 5. If the cause of the problem resides within the RG, the method can include notifying the appropriate customer care center of the particular RG for special handling, at block 622. In one embodiment, the appropriate customer care may contact the customer having the particular RG to obtain further information or provide an instruction for a task, such as reinitializing the particular RG. If the cause of the problem does not reside within the RG ("No" branch from decision tree 602), the method can include performing an Ethernet diagnosis and test, at block 642. In a particular embodiment, the Ethernet switch may be the last significant device within a CO before reaching the VRAD. If the test fails, the method can include notifying the appropriate workcenter for special handling. For example, a technician may be dispatched to the particular Ethernet switch to perform further diagnosis, testing, inspection, or the like.

If the cause of the problem resides within the VRAD ("Yes" branch from decision tree 522), a determination can be made whether the VRAD can be pinged, at decision tree 524. In one embodiment, the rule management module 410 can instruct the test module 414 to ping the VRAD. If the test module 414 does not receive a reply from the VRAD in response to the ping, the method can include notifying the network operations center for special handling, at block 842 in FIG. 5. Otherwise ("Yes" branch from decision tree 524), the method can include performing a logical test on the VRAD, at block 542 in FIG. 5. The logical test can be performed by the test module 414 and may be designed to detect a software failure, information regarding hardware, or any combination thereof. For example, a software failure may be due to a failed download or a rollback of a part or all of affected software. Alternatively, the test module 410 may compare actual information related to a particular piece or set of hardware or software to recorded information. The information can be hardware addresses, configuration information, version or maker of the hardware or software, preferences or other settings, other actual information that can be compared to recorded information, or any combination thereof.

A determination is made whether the VRAD passes the logical test, at decision tree 544. If the VRAD does not pass the logical test ("No" branch from decision tree 544), the method can further include performing a repair, at block 702 in FIG. 6. The repair may vary depending on the result of the test. If the hardware address or version or maker of the hardware or software, the recorded information regarding the VRAD may be replaced by the actual information from the VRAD. In another embodiment, the software may be rolled back to a prior version that is known to have worked with the VRAD. In still another embodiment, a particular hardware or software (e.g., a Java engine) may be rebooted, reinitialized, or otherwise reset.

The logical tests and corresponding repairs described herein are merely exemplary and do not limit the scope of the invention. Other tests can be performed and corresponding repairs may be made. After reading this specification, skilled artisans will be able to devise logical tests and appropriate repairs to the VRAD without having to dispatch a technician to the particular VRAD affected.

A determination is then made whether the repair worked, at block 704. If the repair did not work, the method can include notifying the network operations center for special handing, at block 842 in FIG. 5. If the repaired worked ("Yes" branch from decision tree 704 in FIG. 6) or if the VRAD passed the logical test ("Yes" branch from decision tree 544 in FIG. 5), the method can also include validating physical alarms and video error messages, at block 722 in FIG. 6. In one embodiment, the validation can include determining whether there are any physical alarms and video error messages after repair has been made.

Figure 6:
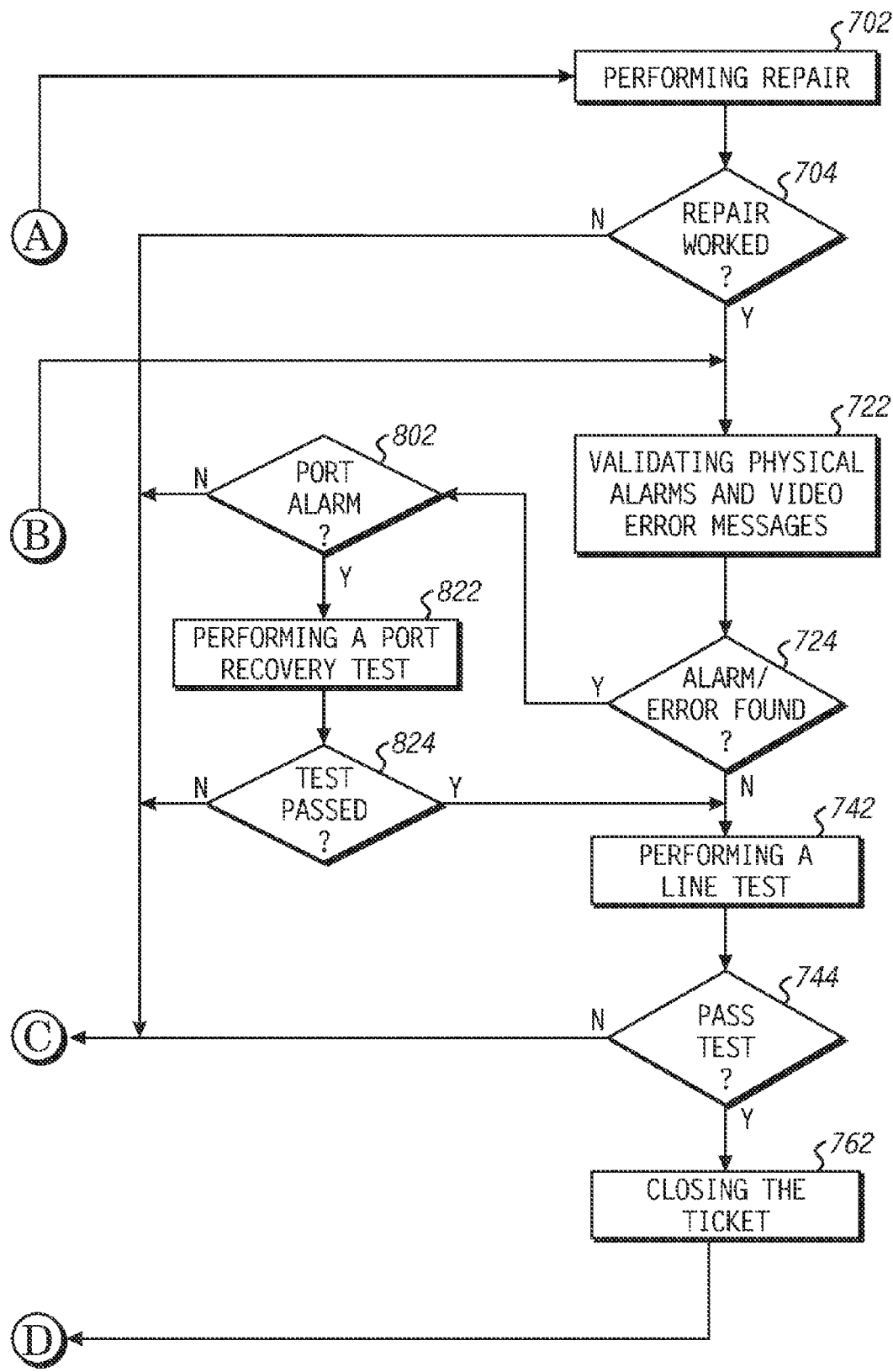

A determination is then made whether an alarm or error was found, at decision tree 724 in FIG. 6. If an alarm or error was found, a determination can then be made whether the alarm or error was a port alarm, at decision tree 802 in FIG. 6. If the alarm or error is a port alarm, the method can still further include performing a port recovery test, at block 822, and determining whether the VRAD passed the port recovery test, at decision tree 824. In one embodiment, the port recovery test can include resetting a port or a board that includes the port. If the port recovery test failed ("No" branch from decision tree 824), the method can include notifying the network operations center for special handing, at block 842 in FIG. 5.

If the port recovery test passed ("Yes" branch from decision tree 824) or there were no alarms or errors found ("No" branch from decision tree 724), the method can further include performing a line test, at block 742. In a particular embodiment, the test module 414 can perform a double-ended line test (DELT) and a single-ended line test (SELT). The DELT can be used to if a modem at the VRAD 262 is synchronized with a mode at the RG 302 are synchronized with one another. The SELT can be used send an echo response test to determine if the line between the VRAD and the RG has a physical layer electrical fault.

A determination whether a line test or any combination of line tests passed, at decision tree 744. If any test or combination of tests did not pass, the method can include notifying the network operations center for special handing, at block 842 in FIG. 5. Otherwise, the problem may no longer exist, and the method can include closing the ticket at block 762 in FIG. 7. The information generated from execution of the automated method can be collected by the rule management module 410, and the rule management module 410 can pass information during any point in the method to provide the ticketing module 406. The rule management module 410 can pass an instruction to the ticketing module 406 to close the ticket.

The methods described herein can be implemented in whole or in part as an automated method. Little or no human intervention may be involved. For example, a problem can be detected by the monitor module 416. The monitor module 416 can send appropriate information that is received by the rule management module 410. The rule management module 410 can instruct the ticketing module 406 to generate a ticket for the problem detected. The rule management module 410 can work with existing data and instruct the test module 414, the monitor module 416, or any combination thereof to obtain further information via tests. The rule management module 410 can use the existing data, generated data, or any combination thereof and can access tables, rules, policies, or the like within the database 412 to determine what actions should be taken. The actions can include performing further tests, performing repairs or other recovery actions, or notifying a customer care or workcenter that a human (e.g., a technician) needs to contact the customer, be dispatched to the VRAD, or take an action within the network 200.

Figure 7:
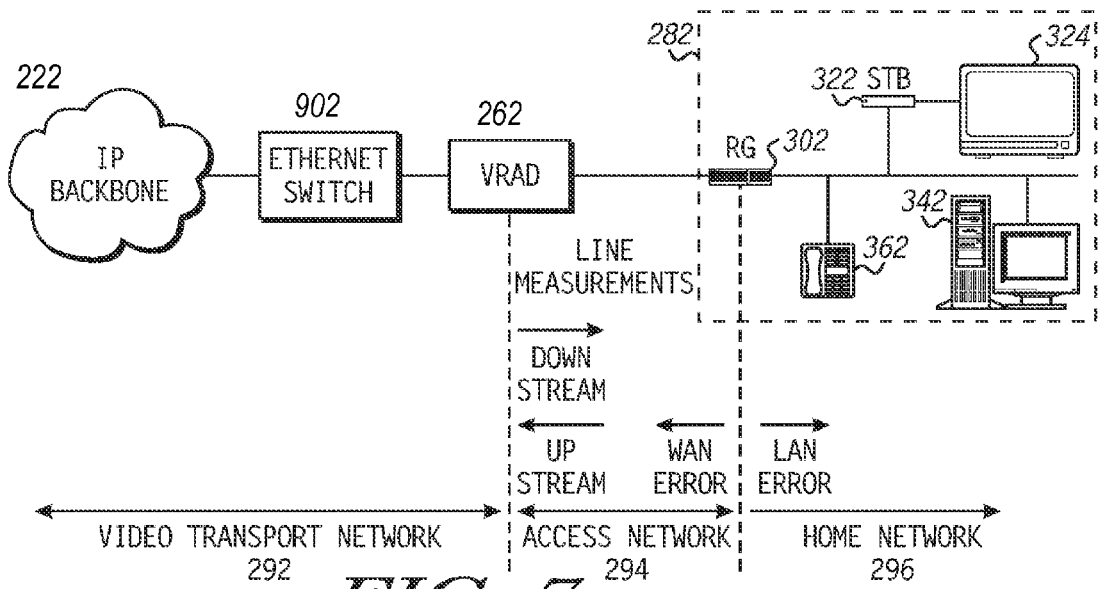
FIG. 7 includes an illustration of a block diagram of a portion of a network that supports the Internet protocol television system.
Figure 8:
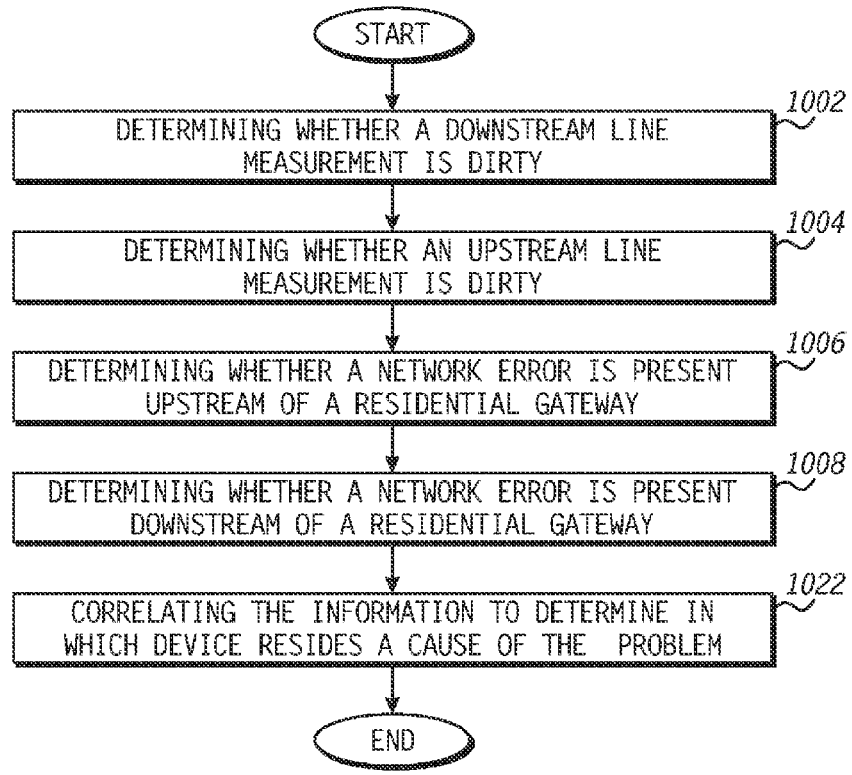
FIG. 8 includes a flow diagram illustrating an exemplary method that can be used to isolate a device in which a cause of a problem resides.

The methods described herein can be performed very quickly. For example, a problem may be detected and resolved in less than nine minutes, and the customer may not have even experienced the problem. FIGS. 7 and 8 illustrate one embodiment for isolating the cause of the problem. FIG. 7 includes a simplified illustration of the network. The BB 222, VRAD 262, CPE 282, video transport network 292, access network 294, and home network 296 in FIG. 7 have been previously described with respect to FIGS. 2 and 3. FIG. 7 further includes an Ethernet switch 902. In a particular embodiment, the Ethernet switch 902 may be within the video transport network 292 and may represent the first significant device upstream from the VRAD 262. FIG. 7 also includes notations of directions for line tests and network errors that are described in more detail with the method in the flow diagram of FIG. 8.

The method can include determining whether a downstream line measurement is dirty, at block 1002 in FIG. 8. The term "dirty" is to be construed broadly to include no measurement can be taken, a measurement is outside an alarm limit or a control limit, an indeterminate condition has occurred (not clearly passed or failed), whether an error exists or has occurred, or the like. The term "clean" is the opposite of dirty, and therefore, represents the lack of a condition or other information that would be construed to be dirty. The downstream line measurement can correspond to network traffic transmitted from the VRAD 262 towards the CPE 282. The method can also include determining whether an upstream line measurement is dirty, at block 1004. The upstream line measurement can correspond to network traffic transmitted from the CPE 282 towards the VRAD 262. The method can further include determining whether a wide area network (WAN) error is present. A WAN error would be located in the network 200 upstream of the RG 302. The method can still further include determining whether a local area network (LAN) error is present in the network downstream of the RG 302.

The rule management module 410 uses the information from clean/dirty determinations made and correlates such information to determine in which device resides a cause of the problem, at block 1022 in FIG. 8. In one particular embodiment, the database 412 can include a table that has information similar to Table 1 below. The rule management module 410 can be used to query the database 412 in order to isolate the problem to a particular device.

TABLE 1

| Upstream Measurements | Downstream Measurements | WAN Error | LAN Error | Problem Isolates to: |
|---|---|---|---|---|
| Dirty | Clean | Clean | Clean | VRAD |
| Clean | Dirty | Dirty | Clean | Access Network |
| Clean | Clean | Dirty | Clean | RG |
| Clean | Clean | Clean | Dirty | CPE other than RG |

The system and modules described herein can be implemented using a general computing system, and the methods described can be carried out by the general computing system that may be located with in the network.

Figure 9:
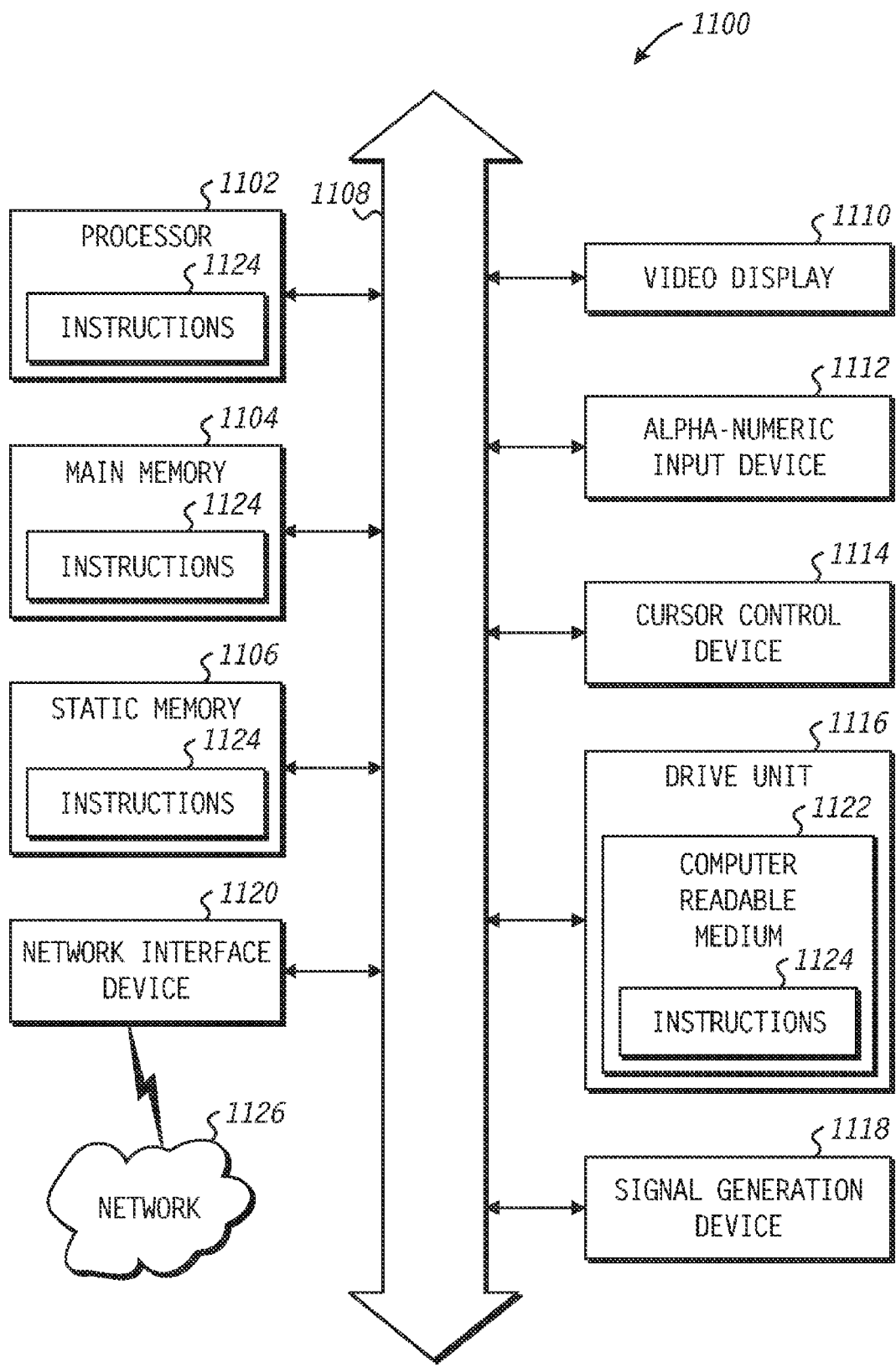
FIG. 9 includes a block diagram of an illustrative embodiment of a general computer system.

FIG. 9 includes an illustrative embodiment of a general computer system 1100. The computer system 1100 can include a set of instructions that can be executed to cause the computer system 1100 to perform any one or more of the methods or computer based functions disclosed herein. The computer system 1100 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 1100 can also be implemented as or incorporated into various devices, such as a desktop PC, a laptop PC, an STB, a personal digital assistant (PDA), a mobile device, a palmtop computer, a laptop computer, a desktop computer, a communications device, a wireless telephone, a wireline telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1100 can be implemented using electronic devices that provide voice, video or data communication. Further, while a single computer system 1100 is illustrated, the term "system" shall also be taken to include any collection of systems or sub-systems that individually or jointly execute a set, or multiple sets, of instructions to perform one or more computer functions.

The computer system 1100 may include a processor 1102, such as a central processing unit (CPU), a graphics processing unit (GPU), or both. Moreover, the computer system 1100 can include a main memory 1104 and a static memory 1106 that can communicate with each other via a bus 1108. As shown, the computer system 1100 may further include a video display unit 1110, such as a liquid crystal display (LCD), an organic light emitting diode (OLED), a flat panel display, a solid state display, or a cathode ray tube (CRT). Additionally, the computer system 1100 may include an input device 1112, such as a keyboard, and a cursor control device 1114, such as a mouse. The computer system 1100 can also include a disk drive unit 1116, a signal generation device 1118, such as a speaker or remote control, and a network interface device 1120 to communicate with a network 1126. In a particular embodiment, the disk drive unit 1116 may include a computer-readable medium 1122 in which one or more sets of instructions 1124, such as software, can be embedded. Further, the instructions 1124 may embody one or more of the methods or logic as described herein. In a particular embodiment, the instructions 1124 may reside completely, or at least partially, within the main memory 1104, the static memory 1106, and/or within the processor 1102 during execution by the computer system 1100. The main memory 1104 and the processor 1102 also may include computer-readable media.

Embodiments described herein can be used to implement a more proactive system for use with a broadcast network. More specifically, the system can address problems and perform a diagnosis within an IPTV network. In one embodiment, most or all of the method can be automated to operate without human intervention. Thus, an automated method can be used to detect a problem and diagnose the cause of the problem. The diagnosis can include isolating the problem, and the automated method can potentially repair the problem relatively quickly. In one embodiment, each of diagnosing the problem and making reparations may be able to be performed in less than approximately 9 minutes, less than approximately 5 minutes, or less than approximately 2 minutes. In a particular embodiment, diagnosing the cause of the problem may take only a half minute. If the system cannot repair the problem, notifications can be made to allow for special handling, such as dispatching a technician to a VRAD or equipment coupled to the VRAD, such as an Ethernet switch or a RG. A communication can be sent to personnel within a customer care center, a workcenter or elsewhere within the network in real time or within a few seconds. The notification can include an identification of the problem, results from an initial diagnosis, and a device in which the cause of the problem is suspected to be located. Problems may be detected and repaired before customers are even aware of problem, and therefore, the customers will continue to have a more consistent, high-level quality of experience.

Many different aspects and embodiments are possible. Some of those aspects and embodiments are described below. After reading this specification, skilled artisans will appreciate that those aspects and embodiments are only illustrative and do not limit the scope of the present invention.

In a first aspect, a system to address a problem associated with a network, the system can include a video ready access device, a test module operable to test the network including the video ready access device, a monitor module operable to monitor the network including the video ready access device, and a rule management module coupled to the testing module and the monitor module. The rule management module can be operable to receive a notification regarding the problem within the network that affects a broadcast video stream, isolate the cause of the problem to a video ready access device, an upstream device that is upstream of the video ready access device, or a downstream device that is downstream of the video ready access device, determine whether a software failure has occurred within the video ready access device, determine whether hardware information associated with hardware of the video ready access device matches recorded information, determine whether a physical alarm, a video error message, or a combination thereof is valid, and perform a line test between the video ready access device and another device downstream of the video ready access device.

In one embodiment of the first aspect, the video content includes a packetized video broadcast stream. In another embodiment, the monitor module is operable to determine whether a software failure has occurred within the video ready access device. When a software failure has occurred, the rule management module is further operable to generate an instruction to another portion of the system to automatically download or reinstall software within the video ready access device, wherein the software corresponds to the software failure and was previously downloaded or installed or rolled back to a prior version of the software. As used herein, the term "when" is to be construed to cover (1) simultaneous occurrence of events or actions or (2) a particular event or action occurs after a different event or action has occurred. For example, the rule management module may be operable to perform particular operations while the software failure is occurring or after the software failure had previously occurred.

In still another embodiment, when the hardware information is different from the recorded information, the rule management module is further operable to generate an instruction to another portion of the system to automatically reset the hardware or a portion thereof, update the recorded information, or any combination thereof. In a further embodiment, the test module is operable to perform a line test. In still a further embodiment, the monitor module is operable to monitor a transmission variable of the network.

In a second aspect, a method can be used to address a problem associated with a network. The method can include receiving a notification regarding the problem within the network that affects a broadcast video stream and isolating the cause of the problem to a video ready access device, an upstream device that is upstream of the video ready access device, or a downstream device that is downstream of the video ready access device. When the cause is isolated to the video ready access device, the method can also include determining whether a software failure has occurred within the video ready access device. When the software failure occurred, the method can further include downloading or reinstalling software within the video ready access device, wherein the software corresponds to the software failure and was previously downloaded or installed, or rolling back to a prior version of the software. The method can still further include determining whether hardware information associated with hardware of the video ready access device matches recorded information. When the hardware information is different from the recorded information, the method can include resetting the hardware or a portion thereof, updating the recorded information, or any combination thereof. The method can also include determining whether a physical alarm, a video error message, or a combination thereof is valid and performing a line test between the video ready access device and another device downstream of the video ready access device. Isolating the cause of the problem, determining whether a software failure has occurred, determining whether hardware information associated with hardware of the video ready access device matches recorded information, determining whether a physical alarm, a video error message, or a combination thereof is valid, and performing line tests can be performed by a particular device or collectively by different devices within the network.

In one embodiment of the second aspect, the problem is associated with a packetized video broadcast stream. In another embodiment, the method further includes when the cause is isolated to the upstream device, testing the upstream device. In still another embodiment, when a software failure has occurred, the method further includes determining whether the hardware is affected by the problem and determining whether information regarding the type of the hardware and software present. In a particular embodiment, the line test includes a double-ended line test or a single-ended line test. In a more particular embodiment, the double-ended line test is performed to determine whether a modem at a customer's premises is synchronized, and the single-ended line test is performed to determine whether a line has a physical layer electrical fault.

In a further embodiment of the second aspect, the method further includes generating a ticket after receiving the notification, determining whether the line test passes, and when the line test passes, closing the ticket. Generating and closing the ticket can be performed automatically.

In a third aspect, a method of isolating a cause of a problem can include determining whether a downstream line measurement is dirty, wherein the downstream line measurement corresponds to network traffic transmitted from a video ready access device towards a customer's premises, and determining whether an upstream line measurement is dirty, wherein the upstream line measurement corresponds to network traffic transmitted from the customer's premises towards the video ready access device. The method can also include determining whether a first network error is present in the network upstream of a residential gateway, and determining whether a second network error is present in the network downstream of a residential gateway. The method can also include correlating information obtained by performing the determinations to determine in which device within the video transmission network resides a cause of a problem association with a transmission of a packetized video broadcast stream.

In one embodiment of the third aspect, the cause is isolated to a video ready access device when the upstream line measurement is dirty, the downstream measurement is clean, the first network error is not present, and the second network error is not present. The cause can be isolated to a local loop when the upstream line measurement is clean, the downstream measurement is dirty, the first network error is present, and the second network error is not present. The cause can be isolated to a residential gateway when the upstream line measurement is clean, the downstream measurement is clean, the first network error is present, and the second network error is not present. The cause can be isolated to customer premises equipment when the upstream line measurement is clean, the downstream measurement is clean, the first network error is not present, and the second network error is present.

A processor readable medium can include code. The code can include instructions for a processor to carry out any part or all of the methods described herein.

Note that not all of the activities described above in the general description or the examples are required, that a portion of a specific activity may not be required, and that one or more further activities may be performed in addition to those described. Still further, the order in which activities are listed are not necessarily the order in which they are performed.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A system to address a problem associated with a network, the system comprising:
   a video ready access device operable to transmit a packetized video broadcast stream;
   a test module operable to test the network including the video ready access device;
   a monitor module operable to monitor the network including the video ready access device; and
   a rule management module coupled to the testing module and the monitor module,
   wherein the rule management module is operable to:
      receive a notification regarding a problem within the network that affects the packetized video broadcast stream;
      isolate the cause of the problem to a video ready access device, an upstream device that is upstream of the video ready access device, or a downstream device that is downstream of the video ready access device;
      determine whether a software failure has occurred within the video ready access device;
      determine whether hardware information associated with hardware of the video ready access device matches recorded information;
      determine whether a physical alarm, a video error message, or a combination thereof is valid; and
      perform a line test between the video ready access device and another device downstream of the video ready access device;
   wherein the monitor module is operable to determine whether a software failure has occurred within the video ready access device;
   when the software failure has occurred, the rule management module is further operable to generate an instruction to another portion of the system to automatically:
      download or reinstall software within the video ready access device, wherein the software corresponds to the software previously downloaded or installed; or
      rollback to a prior version of the software;
   wherein when the hardware information is different from the recorded information, the rule management module is further operable to generate an instruction to another portion of the system to automatically:
      reset the hardware or a portion thereof;
      update the recorded information; or
      any combination thereof.

2. The system of claim 1, wherein the test module is operable to perform a line test.

3. The system of claim 1, wherein the monitor module is operable to monitor a transmission variable of the network.

4. A method of addressing a problem associated with a network, the method comprising:
   receiving a notification regarding the problem within the network that affects a broadcast video stream;
   isolating the cause of the problem to a video ready access device, an upstream device that is upstream of the video ready access device, or a downstream device that is downstream of the video ready access device;
   when the cause is isolated to the video ready access device, determining whether a software failure has occurred within the video ready access device;

when the software failure has occurred:
   downloading or reinstalling software within the video ready access device, wherein the software corresponds to the software previously downloaded or installed; or
   rolling back to a prior version of the software;
determining whether hardware information associated with hardware of the video ready access device matches recorded information;
when the hardware information is different from the recorded information, resetting the hardware or a portion thereof, updating the recorded information, or any combination thereof;
determining whether a physical alarm, a video error message, or a combination thereof is valid;
performing a line test between the video ready access device and another device downstream of the video ready access device, and
isolating the cause of the problem by determining whether a software failure has occurred, determining whether hardware information associated with hardware of the video ready access device matches recorded information, determining whether a physical alarm, a video error message, or a combination thereof is valid, and performing line tests are performed by a particular device or collectively by different devices within the network.

5. The method of claim 4, wherein the problem is associated with a packetized video broadcast stream.

6. The method of claim 4, comprising when the cause is isolated to the upstream device, testing the upstream device.

7. The method of claim 4, when the software failure has occurred, the method comprising:
   determining whether the hardware is affected by the problem; and
   determining information regarding the type of the hardware and software.

8. The method of claim 7, wherein performing the line test comprises performing a double-ended line test or a single-ended line test.

9. The method of claim 8, wherein the double-ended line test that is performed to determine whether a modem at a customer's premises is synchronized.

10. The method of claim 8, wherein the single-ended line test that is performed to determine whether a line has a physical layer electrical fault.

11. The method of claim 4, comprising:
   generating a ticket after receiving the notification;
   determining whether the line test passes; and
   when the line test passes, closing the ticket,
   wherein generating and closing the ticket is performed automatically.

12. A processor readable non-transitory medium comprising computer instructions, wherein the computer instructions cause a processor to:
   access a notification regarding the problem within the network that affects a broadcast video stream;
   isolate the cause of the problem to a video ready access device, an upstream device that is upstream of the video ready access device, or a downstream device that is downstream of the video ready access device;
   when the cause is isolated to the video ready access device, determine whether a software failure has occurred within the video ready access device;
   when the software failure has occurred:
      download or reinstall software within the video ready access device, wherein the software corresponds to the software previously downloaded or installed; or
      rollback to a prior version of the software;
   determine whether hardware information associated with hardware of the video ready access device matches recorded information;
   when the hardware information is different from the recorded information, reset the hardware or a portion thereof, updating the recorded information, or any combination thereof;
   determine whether a physical alarm, a video error message, or a combination thereof is valid; and
   perform a line test between the video ready access device and another device downstream of the video ready access device.

13. The processor readable non-transitory medium of claim 12, wherein the problem is associated with a packetized broadcast stream.

14. The processor readable non-transitory medium of claim 12, comprising computer instructions that cause the processor to test the upstream device when the cause of the problem is isolated to the upstream device.

15. The processor readable non-transitory medium of claim 12, comprising computer instructions that cause the processor to:
   determine whether hardware is affected by the problem; and
   determine information regarding the type of the hardware and software.

16. The processor readable non-transitory medium of claim 15, comprising computer instructions that cause the processor to performing a double-ended line test or a single-ended line test.

17. The processor readable non-transitory medium of claim 16, wherein the double-ended line test is performed to determine whether a modem at a customer's premises is synchronized.

18. The processor readable non-transitory medium of claim 16, wherein the single-ended line test that is performed to determine whether a line has a physical layer electrical fault.

19. The processor readable non-transitory medium of claim 12, comprising computer instructions that cause the processor to:
   generate a ticket after receiving the notification;
   determine whether the line test passes; and
   when the line test passes, close the ticket,
   wherein generating and closing the ticket is performed automatically.

* * * * *